United States Patent
Tang et al.

(10) Patent No.: US 12,512,511 B2
(45) Date of Patent: Dec. 30, 2025

(54) SOLID ELECTROLYTE INCLUDING POLYMER CONTAINING BORON AND FLUORINE STRUCTURE, PREPARATION METHOD, AND LITHIUM ION BATTERY INCLUDING THE SAME

(71) Applicant: Zhuhai CosMX Battery Co., Ltd., Zhuhai (CN)

(72) Inventors: Weichao Tang, Zhuhai (CN); Suli Li, Zhuhai (CN); Wei Zhao, Zhuhai (CN); Hao Yuan, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 735 days.

(21) Appl. No.: 17/847,196

(22) Filed: Jun. 23, 2022

(65) Prior Publication Data
US 2022/0328874 A1    Oct. 13, 2022

Related U.S. Application Data

(63) Continuation of application No. PCT/CN2020/138139, filed on Dec. 21, 2020.

(30) Foreign Application Priority Data

Dec. 23, 2019    (CN) .......................... 201911339899.9

(51) Int. Cl.
*H01M 10/0565* (2010.01)
*C08F 222/10* (2006.01)
(Continued)

(52) U.S. Cl.
CPC ... *H01M 10/0565* (2013.01); *C08F 222/1063* (2020.02); *C08F 230/06* (2013.01);
(Continued)

(58) Field of Classification Search
CPC .......... H01M 10/0565; H01M 10/0525; C08F 222/1063; C08F 230/06
(Continued)

(56) References Cited

U.S. PATENT DOCUMENTS

2010/0009266 A1    1/2010    Itoh et al.
2014/0113203 A1    4/2014    Xiao et al.

FOREIGN PATENT DOCUMENTS

CN    1412236 A    4/2003
CN    101563807 A    10/2009
(Continued)

OTHER PUBLICATIONS

"Ration." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1283108. (Year: 2010).*
(Continued)

*Primary Examiner* — Sean P Cullen
(74) *Attorney, Agent, or Firm* — Kilpatrick Townsend & Stockton LLP

(57) ABSTRACT

The preparation method of the solid polymer electrolyte includes the following steps: S1, adding a vinyl boron fluorine monomer, a vinyl polyether monomer, a modified monomer, and a functional polymer into a solvent, adding an initiator for reaction, and after performing a purification treatment to obtain a polymer system B; S2, adding the polymer system B, a lithium salt, a filler, and an auxiliary agent into a solvent, and adding a crosslinking agent to obtain a mixed solution, and coating the mixed solution on a mold uniformly for reaction; S3, obtaining the solid polymer electrolyte. The obtained solid polymer electrolyte, a positive electrode plate, and a negative electrode plate are assembled into a solid-state battery core, and then a tab
(Continued)

welding, a heat treatment, and an encapsulation treatment are performed to obtain a lithium ion battery.

7 Claims, 1 Drawing Sheet

(51) Int. Cl.
  *C08F 230/06* (2006.01)
  *H01M 10/0525* (2010.01)
(52) U.S. Cl.
  CPC .................. *H01M 10/0525* (2013.01); *H01M 2300/0082* (2013.01); *H01M 2300/0085* (2013.01)
(58) Field of Classification Search
  USPC ......... 429/316, 317; 524/857; 525/200, 276, 525/2; 528/4, 401
  See application file for complete search history.

(56) References Cited

FOREIGN PATENT DOCUMENTS

| | | | | |
|---|---|---|---|---|
| CN | 103509153 | A | | 1/2014 |
| CN | 105914397 | A | | 8/2016 |
| CN | 106229547 | A | * | 12/2016 |
| CN | 106432608 | A | | 2/2017 |
| CN | 107331892 | A | | 11/2017 |
| CN | 108414485 | A | * | 8/2018 ......... G01N 21/6486 |
| CN | 108417894 | A | | 8/2018 |
| CN | 108444961 | A | | 8/2018 |
| CN | 108475814 | A | | 8/2018 |
| CN | 109326822 | A | | 2/2019 |
| CN | 109509911 | A | | 3/2019 |
| CN | 109575187 | A | | 4/2019 |
| CN | 109904010 | A | | 6/2019 |
| CN | 107819156 | B | | 4/2020 |
| CN | 111162312 | A | | 5/2020 |
| CN | 109301317 | B | | 2/2021 |
| JP | 2008094825 | A | | 4/2008 |
| JP | 2008266273 | A | | 11/2008 |
| JP | 2010177001 | A | * | 8/2010 |
| JP | 5289727 | B2 | | 9/2013 |
| WO | 2012138844 | A2 | | 10/2012 |

OTHER PUBLICATIONS

"Ratio." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1283105. (Year: 2010).*

Yan et al., Highly efficient solid polymer electrolytes using ion containing polymer microgels, Dec. 2014, Polymer Chemistry, 6, 1052-1055 (Year: 2014).*

"Organic." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1273875. (Year: 2010).*

"Functional group." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1249514. (Year: 2010).*

International Search Report and Written Opinion mailed in International Application PCT/CN2020/138139 on Mar. 24, 2021.

The first and supplemental search report in CN Application 2019113398999.

The first Office Action received in CN Application 2019113398999.

The second Office Action received in CN Application 2019113398999.

The Notification to Grant Patent Right for Invention received in CN Application 2019113398999.

The extended European Search Report received in the European Application 20906924.4, mailed Apr. 20, 2023.

Thomas: "GPC/SEC Practical Tips and Tricks", Oct. 1, 2011 (Oct. 1, 2011), XP055608344, 38 pages.

Prof Premamoy Ghosh: "Polymer Science Fundamentals of Polymer Science—Molecular Weights of Polymers", Sep. 21, 2006 (Sep. 21, 2006), XP055608363, 22 pages.

* cited by examiner

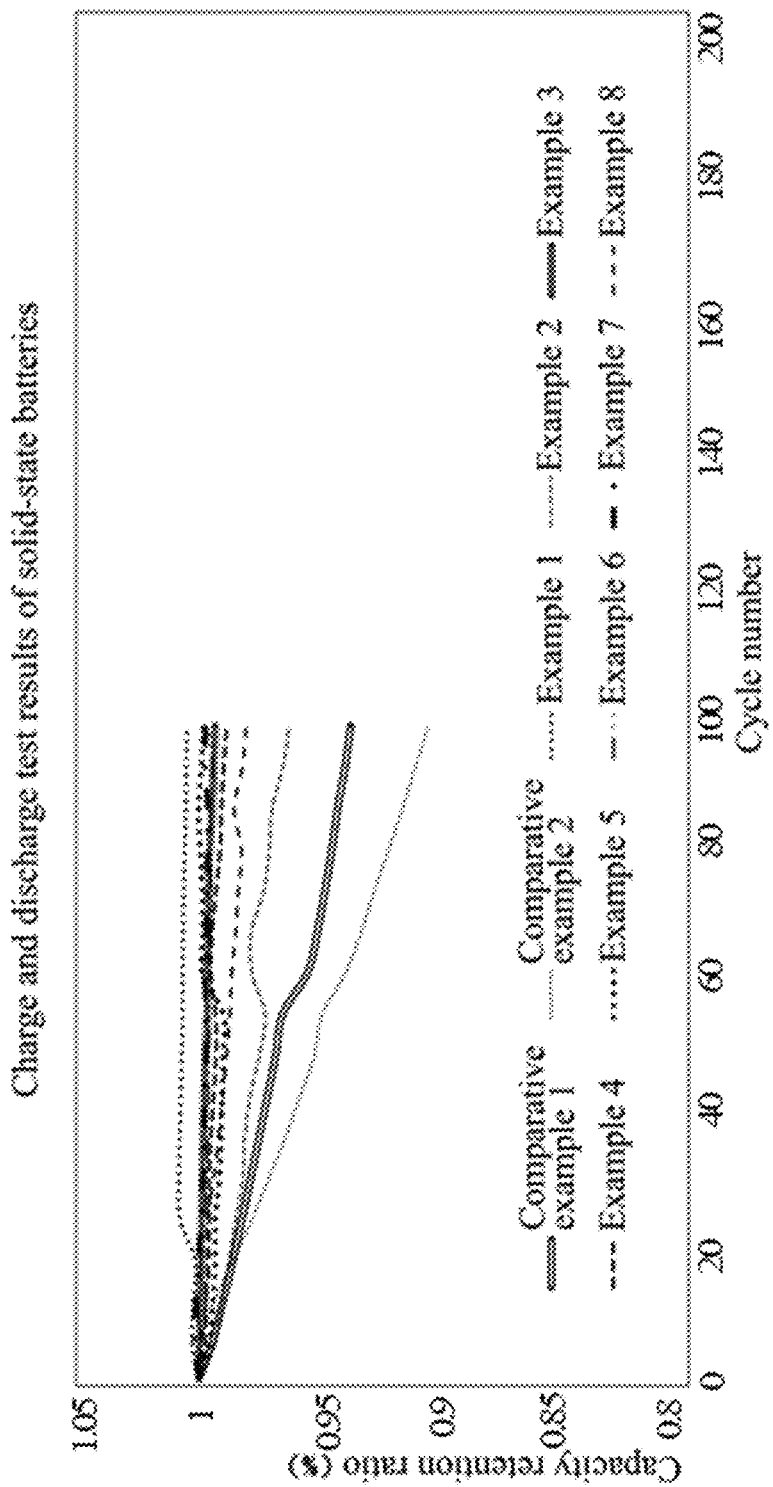

SOLID ELECTROLYTE INCLUDING POLYMER CONTAINING BORON AND FLUORINE STRUCTURE, PREPARATION METHOD, AND LITHIUM ION BATTERY INCLUDING THE SAME

CROSS-REFERENCE TO RELATED APPLICATIONS

This application is a continuation of International Application No. PCT/CN2020/138139, filed on Dec. 21, 2020, which claims priority to Chinese Patent Application No. 201911339899.9, filed on Dec. 23, 2019, both of which are hereby incorporated by reference in their entireties.

TECHNICAL FIELD

The present disclosure relates to the field of lithium ion battery technologies, and in particular, to a solid polymer electrolyte containing boron and fluorine structures, and a preparation method and application thereof.

BACKGROUND

Lithium ion batteries have been widely used in digital, power and other energy storage fields. The lithium ion battery is mainly composed of a positive electrode material, a negative electrode material, an electrolyte, a diaphragm, and other main materials. Thermal runaway is easy to occur in the use of the lithium ion battery, resulting in safety problems such as fire and explosion. Solid-state batteries, as the most likely next-generation lithium ion batteries, have characteristics of high mass energy density, high safety, or the like. The solid-state battery is mainly composed of a positive electrode material, a negative electrode material, and a solid electrolyte, where the solid electrolyte mainly includes a sulfide electrolyte, an oxide electrolyte, and a polymer electrolyte. Although the sulfide electrolyte has a high conductivity, it has problems such as poor processability and high cost. The oxide electrolyte has problems such as poor interface contact and poor flexibility. At present, the polymer electrolyte is mainly represented by polyethylene oxide (PEO) and although the polymer electrolyte has defects such as low conductivity and low high-voltage resistance, electrochemical performances thereof may be improved by improving the structure of the polymer.

In order to improve electrochemical performances of a solid polymer electrolyte, Chinese Invention Patent Application No. 201711049442.5 discloses a non-flammable polymer electrolyte, the polymer electrolyte is mainly composed of a polyether structure and a phosphate ester structure, and the polymer electrolyte contains a large amount of phosphorus-containing structures, and thus has a non-flammable characteristic; however, epoxy structures that are not resistant to a high voltage are introduced thereto, which results in partial oxidation and decomposition of the polymer electrolyte. Chinese Invention Patent Application No. 201810950307.6 discloses a composite high-voltage resistant solid polymer electrolyte prepared from polyethylene oxide, a lithium salt, and an inorganic additive, where the inorganic additive is a boron-containing inorganic additive; however, in the composite solid polymer electrolyte prepared through this patent, boron-containing structures and lithium-conducting polyether structures are simply physically mixed, and the lithium ion conductivity is low at room temperature, both of which directly affects performances and effects thereof.

SUMMARY

One object of the present disclosure is to provide a polymer electrolyte containing boron and fluorine structures.

A second object of the present disclosure is to provide a preparation method of a polymer electrolyte.

A third object of the present disclosure is to provide a lithium ion battery and a preparation method thereof.

A specific technical solution of the present disclosure is as follows.

A first aspect of the present disclosure discloses a polymer electrolyte containing boron and fluorine structures, having a structural formula represented by Formula (I):

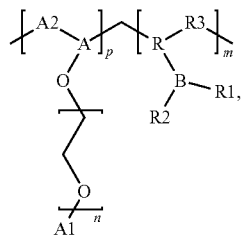

where A, A1, A2, R, R1, R2, and R3 each is an organic functional group.

R, R1, R2, and R3 contain at least one fluorine structure; a molar ratio of Formula

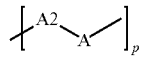

to Formula

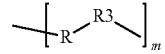

is between (1:9) and (9:1);

n, m and p are a positive integer.

Preferably, the boron structure includes C—B, B—O or B—F.

Preferably, polymer electrolyte in unit mole contains 0.1-0.9 moles of boron structure.

Preferably, polymer electrolyte in unit mole contains 0.1-18 moles of fluorine structure.

Preferably, a molar ratio of the boron structure to the fluorine structure is between 1:20 and 1:1. More preferably, the molar ratio of the boron structure to the fluorine structure is between 1:12 and 1:1.

A second aspect of the present disclosure discloses a preparation method of a polymer electrolyte, including following steps:

S1, adding a vinyl boron fluorine monomer, a vinyl polyether monomer, a modified monomer, and a functional polymer into a solvent, and stirring in an atmosphere of nitrogen or inert gas until uniform, and then adding an initiator, and after a reaction is finished, performing a purification treatment to obtain a polymer system B;

S2, adding the polymer system B, a lithium salt, a filler, and an auxiliary agent into a solvent, and stirring in an atmosphere of nitrogen or inert gas until uniform, and then adding a crosslinking agent to obtain a mixed solution, and uniformly coating the mixed solution on a mold, and placing it into a vacuum drying oven and introducing nitrogen or inert gas therein for reaction; and S3, after the reaction is finished, in nitrogen or inert gas as a replacement gas, performing a drying treatment in the vacuum drying oven to obtain the polymer electrolyte.

It will be understood that the present disclosure is not limited to the above steps, and may further include other steps. For example, before S1, between S1 and S2, between S2 and S3, and after S3, other additional steps are included without beyond the protection scope of the present disclosure.

It will be understood that after the mixed solution is obtained in S2, other methods may be used in addition to uniformly coating the mixed solution on the mold to form a film. For example, the mixed solution is cast in a mold, and then is dried to form a film.

Preferably, a molecular structural formula of the vinyl boron fluorine monomer is

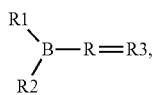

where R, R1, R2 and R3 each is an organic functional group and at least one of R, R1, R2 and R3 is a fluorine-containing structure. Here, R1, R2, and R3 may be connected with each other in a ring shape, or may normally be a separate organic functional group.

More preferably, the vinyl boron fluorine monomer is alpha-(trifluoromethyl)vinyl boronic acid, trans-2-[4-(trifluoromethyl)phenyl]vinyl boronic acid, 2-trifluoromethyl-trans-beta-styryl boronic acid pinacol ester,1-(trifluoromethyl)vinyl boronic acid hexanol ester, 1-(4-fluorophenyl)vinyl boronic acid pinacol ester, trans-2-(3-fluorophenyl)vinyl boronic acid, trans-2-(4-fluorophenyl)vinyl boronic acid, 1-(1-(difluoroboryl)-oxy-3H-benzo(f)chromen-2-yl)-ethanone, E-2-[3, 5-bis(trifluoromethyl)phenyl]vinyl boronic acid pinacol ester, trans-2-[3-(trifluoromethyl)phenyl]vinyl boronic acid, 3-trifluoromethyl-trans-beta-styryl boronic acid pinacol ester, 4-trifluoromethyl-trans-beta-styryl boronic acid pinacol ester, trans-2-(3,5-difluorophenyl)vinyl boronic acid pinacol ester, or 1-trifluoromethyl vinyl boronic acid, and molecular structural formulas of them are

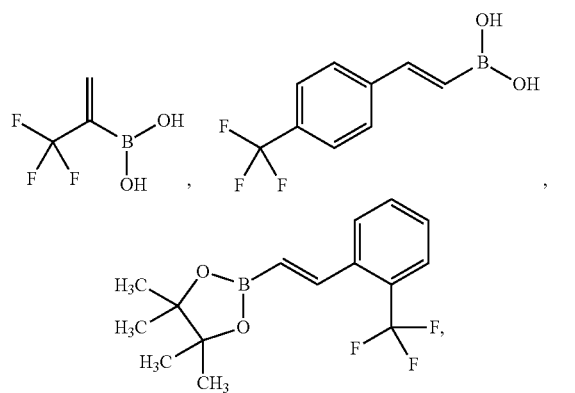

-continued

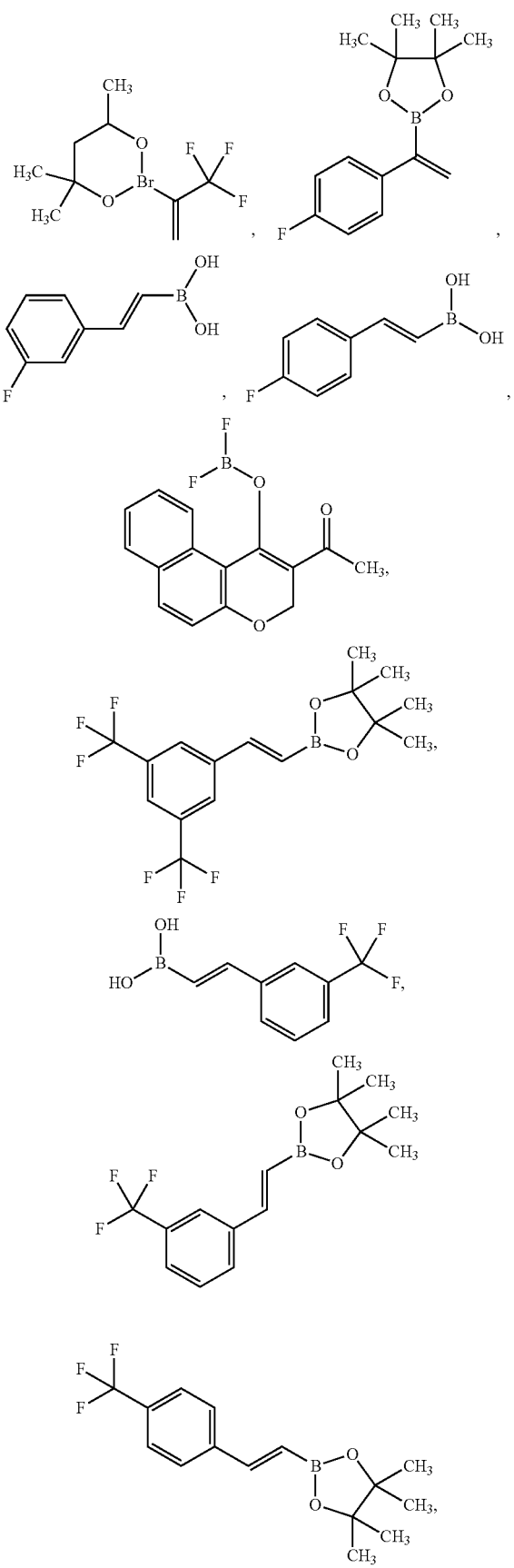

-continued

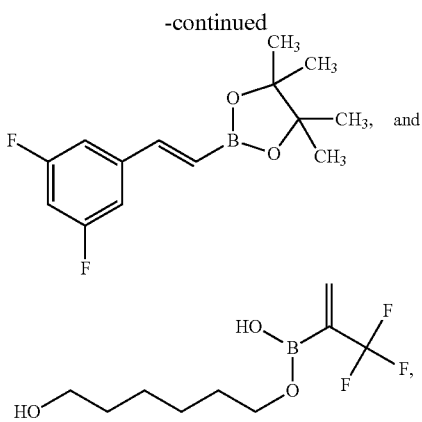

respectively.

It will be understood that the vinyl boron fluorine monomer in the present disclosure is not limited to the above structures, and any suitable vinyl boron fluorine monomer may be selected by those skilled in the art to achieve the present disclosure without beyond the protection scope of the present disclosure.

Preferably, a molecular structural formula of the vinyl polyether monomer is

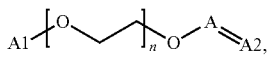

where A, A1 and A2 each is an organic functional group, and n is a positive integer, and a molecular weight of the vinyl polyether monomer is 100 to 50,000.

More preferably, the vinyl polyether monomer is polyethylene glycol methacrylic acid, polyethylene glycol diallyl ether, polyethylene glycol allyl methyl ether, polyethylene glycol mono allyl ether, polyethylene glycol methacrylate, polyethylene glycol dimethacrylate, polyethylene glycol phenyl ether acrylate, triethylene glycol dimethacrylate, methoxy polyethylene glycol acrylate, or carboxy polyethylene glycol acrylate.

It will be understood that the vinyl polyether monomer in the present disclosure is not limited to the above structures, and any suitable vinyl polyether monomer may be selected by those skilled in the art to achieve the present disclosure without beyond the protection scope of the present disclosure.

Preferably, in S1, based on parts by weight, 10-90 parts of vinyl boron fluorine monomer, 10-90 parts of vinyl polyether monomer, 0-5 parts of modified monomer, and 0-10 parts of functional polymer are added into 200-500 parts of solvent.

Preferably, in S1, the stirring condition is: stirring at a rotation speed of 200-2,000 r/min for 20-200 min.

Preferably, based on parts by weight, in S1, 0.05-2.00 parts of initiator are added, and then the reaction is carried out for 3-50 h at 50-120° C., and the polymer system B is obtained after the purification treatment.

Preferably, the modified monomer is one of a monomer of an acrylate system, a monomer of a vinyl nitrile system, a monomer of an acrylic acid system, a monomer of a vinyl benzene system, and a monomer of a vinyl anhydride system, or any combination thereof.

In some specific embodiments of the present disclosure, the monomer of the acrylate system is preferably a monomer of methyl methacrylate, a monomer of ethyl acrylate, a monomer of methyl 2-methacrylate, and a monomer of ethyl 2-methacrylate, etc.; the monomer of the vinyl nitrile system is preferably a monomer of acrylonitrile, a monomer of styryl nitrile, a monomer of dimethyl vinyl hexane nitrile, etc.; the monomer of the acrylic acid system is preferably a monomer of acrylic acid, a monomer of butenic acid, etc.; the monomer of the vinyl benzene system is preferably a monomer of styrene, a monomer of diphenylethene, a monomer of styrenesulfonic acid, etc.; and the monomer of the vinyl anhydride system is preferably a monomer of vinyl sulfonic acid, a monomer of maleic anhydride, a monomer of vinyl acetic acid, etc.

It will be understood that the modified monomer in the present disclosure is not limited to the above structures, and any suitable modified monomer may be selected by those skilled in the art to achieve the present disclosure without beyond the protection scope of the present disclosure.

Preferably, the functional polymer is one of soluble polyolefin, soluble polynitrile, soluble polyester, soluble fluorine-containing polymer, polyacrylic acid, polystyrene acrylic acid copolymer, and poly-phenylene terephthamide, or any combination thereof.

In some specific embodiments of the present disclosure, the soluble polyolefin is preferably poly-p-phenylene vinylene, polystyrene, or olefin copolymer; the soluble polynitrile is preferably polyacrylonitrile, aromatic nitrile-based polymer, or nitrile copolymer; the soluble polyester is preferably polymethyl methacrylate, polymethyl acrylate, or ester copolymer; and the soluble fluorine-containing polymer is preferably polytetrafluoroethylene, polyvinylidene fluoride, or polyvinylidene fluoride-hexafluoropropylene.

It will be understood that the functional polymer in the present disclosure is not limited to the above structures, and any suitable functional polymer may be selected by those skilled in the art to achieve the present disclosure without beyond the protection scope of the present disclosure.

Preferably, in S1, the initiator is an azo-based and/or peroxy-based initiator. More preferably, the initiator is one of azobisisobutyronitrile, azobisisoheptonitrile, dimethyl azodiisobutyrate, benzoyl peroxide, and tert-butyl peroxybenzoate, or any combination thereof.

It will be understood that the initiator in the present disclosure is not limited to the above structures, and any suitable initiator may be selected by those skilled in the art to achieve the present disclosure without beyond the protection scope of the present disclosure.

Preferably, in S2, the auxiliary agent is one of methoxy polyethylene glycol borate, methoxy polyethylene glycol aluminate, butanedinitrile, vinyl ethylene carbonate, vinylene carbonate, fluoro carbonate, tetraethylene glycol dimethyl ether, fluorobenzene, and ionic liquid, or any combination thereof.

It will be understood that the auxiliary agent in the present disclosure is not limited to the above structures, and any suitable functional polymer may be selected by those skilled in the art to achieve the present disclosure without beyond the protection scope of the present disclosure.

Preferably, in S1, the solvent is one of toluene, xylene, benzene, N,N-dimethylformamide, N-methyl pyrrolidone, acetonitrile, ethyl acetate, tetrahydrofuran, acetone, dimethyl sulfoxide, dichloromethane, chloroform, and carbon tetrachloride, or any combination thereof.

It will be understood that the solvent in the present disclosure is not limited to the above types, and any suitable solvent may be selected by those skilled in the art to achieve the present disclosure without beyond the protection scope of the present disclosure.

Preferably, in S2, the lithium salt is one of lithium perchlorate (LiClO$_4$), lithium hexafluorophosphate (LiPF$_6$), lithium hexafluoroarsenate (LiAsF$_6$), lithium tetrafluoroborate (LiBF$_4$), lithium bisoxalate borate (LiBOB), lithium difluorooxalato borate (LiDFOB), lithium bis(difluorosulfonyl)imide (LiFSI), lithium bis(trifluoromethanesulfonyl)imide (LiTFSI), lithium trifluoromethanesulfonate (LiCF$_3$SO$_3$), lithium bis(malonato) borate (LiBMB), lithium malonatooxalato borate (LiMOB), lithium hexafluoroantimonate (LiSbF$_6$), lithium difluorophosphate (LiPF$_2$O$_2$), lithium 4,5-dicyano-2-(trifluoromethyl)imidazol (LiDTI), lithium bis(trifluoromethanesulfonyl)imide (LiN(SO$_2$CF$_3$)$_2$), LiN(SO$_2$C$_2$F$_5$)$_2$, LiC(SO$_2$CF$_3$)$_3$, LiN(SO$_2$F)$_2$, or any combination thereof.

It will be understood that the lithium salt in the present disclosure is not limited to the above types, and any suitable lithium salt may be selected by those skilled in the art to achieve the present disclosure without beyond the protection scope of the present disclosure.

Preferably, in S2, the filler is one of nano-silica, nano-titania, nano-alumina, nano-zirconia, diatomite, bentonite, kaolin, attapulgite, lithium phosphate, lithium titanate, lithium titanium phosphate, lithium aluminum titanium phosphate, lithium lanthanum titanate, lithium lanthanum tantalate, lithium aluminum germanium phosphate, lithium aluminosilicate, lithium silicon phosphate, boron trioxide doped lithium phosphate, lithium platinum lanthanum, and lithium lanthanum platinum aluminum oxide, which are organically treated, or any combination thereof.

It will be understood that the filler in the present disclosure is not limited to the above types, and any suitable filler may be selected by those skilled in the art to achieve the present disclosure without beyond the protection scope of the present disclosure.

Preferably, in S2, the crosslinking agent is a carboxyl crosslinking agent. Specifically, the crosslinking agent is one of trifunctional aziridine crosslinking agent, a difunctional aziridine crosslinking agent, trimethylolpropane tris(3-aziridinylpropionate), pentaerythritol tris[3-(1-(aziridinyl) propionic acid], aliphatic polycarbodiimide, aromatic polycarbodiimide, toluene diisocyanate, isophorone diisocyanate (IPDI), diphenylmethane diisocyanate (MDI), dicyclohexylmethane diisocyanate (HMDI), hexamethylene diisocyanate (HDI), lysine diisocyanate (LDI), adipaldehyde, glutaraldehyde, adipoyl chloride, and genipin, or any combination thereof.

It will be understood that the crosslinking agent in the present disclosure is not limited to the above types, and any suitable crosslinking agent may be selected by those skilled in the art to achieve the present disclosure without beyond the protection scope of the present disclosure.

Preferably, based on parts by weight, 40-100 parts of polymer system B, 3-50 parts of lithium salt, 0-20 parts of filler, and 0-15 parts of auxiliary agent are added into 200-400 parts of solvent.

Preferably, based on parts by weight, 0-5.00 parts of crosslinking agent is added into the mixed system. The mixed solution is uniformly coated on the mold with a smooth surface, and reacts for 8-36 hours at 50-120° C. in a vacuum drying oven in which nitrogen or inert gas is introduced and thus in an atmosphere of nitrogen or inert gas.

In a preferred embodiment of the present disclosure, specifically, the preparation method of the solid polymer electrolyte includes following steps:

S1, based on parts by weight, 10-90 parts of vinyl boron fluorine monomer, 10-90 parts of vinyl polyether monomer, 0-5 parts of modified monomer, and 0-10 parts of functional polymer are added into 200-500 parts of solvent, and are stirred for 20-200 min at a rotation speed of 200-2,000 r/min in an atmosphere of nitrogen or inert gas, and then 0.05-2.00 parts of initiator is added, next, the reaction is carried out for 3-50 h at 50-120° C., and a polymer system B is obtained after a purification treatment;

S2, based on parts by weight, 40-100 parts of polymer system B, 3-50 parts of lithium salt, 0-20 parts of filler, and 0-15 parts of auxiliary agent are added into 200-400 parts of solvent, and are stirred for 4-15 h at a rotation speed of 200-2,000 r/min in an atmosphere of nitrogen or inert gas, and then 0-5.00 parts of crosslinking agent is added into the mixed system, the mixed solution is uniformly coated on the mold with a smooth surface, and reacts for 8-36 h at 50-120° C. in the vacuum drying oven into which nitrogen or inert gas is introduced and thus in an atmosphere of nitrogen or inert gas; and S3, after the reaction is finished, in nitrogen or inert gas as the replacement gas, the drying treatment is carried out for 20-60 h at 60-120° C. in the vacuum drying oven, so as to obtain the solid polymer electrolyte.

A third aspect of the present disclosure discloses a solid polymer electrolyte obtained by the above method.

A solid polymer electrolyte in a solid-state lithium ion battery is required to meet following conditions: high voltage resistance, good interface contact, good compatibility with lithium metal, mechanical property, processability, conductivity, or the like. At present, a main component of the solid polymer electrolyte is polyethylene oxide. However, polyethylene oxide has problems such as poor contact, low high-voltage resistance, and high room-temperature crystallinity in a practical use process. The solid polymer electrolyte disclosed in the present disclosure is different from the traditional polyethylene oxide, and introduces boron and fluorine structures that have high voltage resistance by adopting a molecular design method on the premise of not affecting polyether polymer electrolyte, which is able to effectively improve high voltage resistant performance of the solid polymer electrolyte, and the boron and fluorine structures have good compatibility with lithium metal and good interface contact.

A fourth aspect of the present disclosure discloses a lithium ion battery, including the solid polymer electrolyte above. The lithium ion battery has characteristics of high mass energy density, high safety, or the like.

A fifth aspect of the present disclosure discloses a preparation method of a lithium ion battery, including following steps:

assembling the solid polymer electrolyte, a positive electrode plate, and a negative electrode plate into a solid-state battery core, then welding tabs, and performing a heat treatment and an encapsulation treatment, to obtain the lithium ion battery.

Preferably, an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxides of titanium, nano transition metal oxide MO, oxides of iron, oxide of chromium, oxide of molybdenum, and phosphide, or a combination of more of the above, where M is Co, Ni, Cu, or Fe.

It will be understood that the present disclosure is not limited to the above steps, and may further include other steps. For example, other additional steps are further included before welding the tabs, between welding the tabs and the heat treatment, between the heat treatment and the encapsulation treatment, and after the encapsulation treatment without beyond the protection scope of the present disclosure.

On the basis of conformity with general knowledge in the art, the above preferred conditions may be combined at will, without beyond the concepts and the protection scope of the present disclosure.

Beneficial Effects

In the present disclosure, the vinyl boron fluorine monomer and the vinyl polyether monomer are mainly used as main raw materials to prepare the solid polymer electrolyte containing the boron and fluorine structures. In the present disclosure, a structure-controllable solid polymer electrolyte containing the boron and fluorine structures are prepared by controlling, for example, proportions of monomers, type and quantity of initiator, reaction time, and reaction temperature. The solid polymer electrolyte containing the boron and fluorine structures and obtained in the present disclosure has good processability, high voltage resistance, high conductivity, and high compatibility with lithium metal, may be used to prepare a lithium ion battery with high energy density and high safety, and has good application potential.

The polymer electrolyte in the solid polymer electrolyte disclosed in the present disclosure has at least following advantages: 1. the boron structure mainly exists as a borate structure in a vinyl boron fluorine structure, and the borate structure has good electrochemical stability, and is able to effectively improve high voltage resistance of the solid polymer electrolyte; 2. the fluorine structure mainly exists as fluorine substitution in the vinyl boron fluorine structure, and the fluorine-containing structure has good chemical stability, requires high energy for cleavage of a chemical bond, and is able to improve electrochemical stability of the solid polymer electrolyte, and in addition, fluorine element in the fluorine-containing structure has good compatibility with lithium metal in charging and discharging processes of a battery, and is able to form a stable lithium fluoride protective layer on a surface of lithium metal, and the lithium fluoride protective layer can not only effectively improve the compatibility of the solid polymer electrolyte with lithium metal, but also effectively improve uniform deposition of lithium ions in the charging and discharging processes, thereby improving performance of a solid-state battery; 3. the main chain in the solid polymer electrolyte is a vinyl structure, and a structure of the polyether is a comb-shaped branched chain, so that the conductivity of the solid polymer electrolyte at room temperature may be effectively improved; 4. the solid polymer electrolyte monomer in the present disclosure is the vinyl boron fluorine structure, where the boron structure and the fluorine structure are in the same monomer structure, and the combination of the two has a certain chelation effect on a lithium salt with a large anion, is able to promote dissociation of the lithium salt, and improve the electrochemical stability and the conductivity of the solid polymer electrolyte.

BRIEF DESCRIPTION OF DRAWINGS

FIGURE shows results of charging and discharging tests of a solid-state battery in embodiments of the present disclosure.

DESCRIPTION OF EMBODIMENTS

The technical solutions in the present disclosure are described in detail below with reference to the accompanying drawings and the embodiments. However, the present disclosure is not limited to the scope of the embodiments.

Experimental methods without specifying specific conditions in the following embodiments are selected in accordance with conventional methods and conditions, or in accordance with commercial instructions. The reagents and raw materials used in the present disclosure are commercially available.

Example 1

A preparation method of a solid polymer electrolyte is disclosed in the present example, including following steps:
  S1, based on parts by weight, 5 parts of alpha-(trifluoromethyl) vinyl boric acid, 5 parts of 1-(trifluoromethyl)vinyl boronic acid hexanol ester, 60 parts of polyethylene glycol dimethacrylate, 30 parts of polyethylene glycol phenyl ether acrylate, 0.5 parts of polymethyl methacrylate, and 0.5 parts of polyacrylic acid are added into 150 parts of acetonitrile and 50 parts of N-methyl pyrrolidone, kept in an atmosphere of nitrogen or inert gas, and are stirred for 200 min at a rotation speed of 200 r/min, and then 0.05 parts of azobisisobutyronitrile are added and react for 10 h at 50° C., and after a purification treatment, a polymer system B is obtained;
  S2, based on parts by weight, 40 parts of the polymer system B, 2 parts of lithium difluoro(oxalato) borate, 1 part of lithium bis(trifluoromethylsulfonyl)imide, and 2 parts of lithium phosphate doped with boron trioxide, 2 parts of lithium titanium phosphate, 1 part of nano-alumina, 1 part of methoxy polyethylene glycol borate, and 1 part of butanedinitrile are added into 200 parts of tetrahydrofuran, and are stirred for 15 hours at a rotation speed of 200 r/min in an atmosphere of dry nitrogen or inert gas, the mixed solution is uniformly coated on a mold with a smooth surface, and reacts for 8 h at 60° C. in a vacuum drying oven into which nitrogen or inert gas is introduced and thus in an atmosphere of nitrogen or inert gas; and
  S3, after the reaction is finished, in nitrogen or inert gas as a replacement gas, a drying treatment is carried out for 60 h at 60° C. in the vacuum drying oven, so as to obtain the solid polymer electrolyte.

A preparation method of a solid-state lithium ion battery is further disclosed in the present example, including following steps:

The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nano transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 2

A preparation method of a solid polymer electrolyte is disclosed in the present example, including following steps:
S1, based on parts by weight, 20 parts of trans-2-[4-(trifluoromethyl)phenyl]vinyl boronic acid, 70 parts of 1-trifluoromethyl vinyl boronic acid, 10 parts of polyethylene glycol methacrylate, and 10 parts of polyethylene glycol methacrylate are added into 300 parts of toluene and 100 parts of N,N-dimethylformamide, kept in an atmosphere of nitrogen or inert gas and are stirred for 100 min at a rotation speed of 1000 r/min, and then 0.1 parts of benzoyl peroxide are added, and react for 3 h at 120° C., and after a purification treatment, a polymer system B is obtained;
S2, based on parts by weight, 70 parts of the polymer system B, 15 parts of lithium tetrafluoroborate (LiBF$_4$), 10 parts of lithium 4,5-dicyano-2-trifluoromethylimidazol (LiDTI), 5 parts of lithium bis(trifluoromethanesulfonyl)imide, 5 parts of lithium silicon phosphate, and 1 part of lithium lanthanum titanate are added into 100 parts of acetone and 200 parts of acetonitrile, and are stirred for 8 hours at a rotation speed of 600 r/min in an atmosphere of dry nitrogen or inert gas, the mixed solution is uniformly coated on a mold with a smooth surface, and reacts for 20 h at 80° C. in a vacuum drying oven into which nitrogen or inert gas is introduced and thus in the atmosphere of nitrogen or inert gas; and
S3, after the reaction is finished, in nitrogen or inert gas as a replacement gas, a drying treatment is carried out for 40 h at 70° C. in the vacuum drying oven, so as to obtain the solid polymer electrolyte.

A preparation method of a solid-state lithium ion battery is further disclosed in the present example, including following steps:
The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained. An active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nanometer transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 3

A preparation method of a solid polymer electrolyte is disclosed in the present example, including following steps:
S1, based on parts by weight, 20 parts of 1-(4-fluorophenyl)vinyl boronic acid pinacol ester, 5 parts of trans-2-(3-fluorophenyl)vinyl boronic acid, 20 parts of polyethylene glycol methacrylic acid, 10 parts of polyethylene glycol methacrylate, 10 parts of triethylene glycol dimethacrylate, 3 parts of methyl methacrylate, 2 parts of acrylonitrile, and 5 parts of polystyrene are added into 200 parts of benzene and 100 parts of acetonitrile, kept in an atmosphere of nitrogen or inert gas and are stirred for 80 min at a rotation speed of 800 r/min, and then 0.5 parts of tert-butyl peroxybenzoate are added, and react for 20 h at 100° C., and after a purification treatment, a polymer system B is obtained;
S2, based on parts by weight, 80 parts of the polymer system B, 20 parts of lithium bis(difluorosulfonyl) imide (LiFSI), 5 parts of lithium perchlorate (LiClO$_4$), 5 parts of lithium hexafluorophosphate (LiPF$_6$), 5 parts of lithium hexafluoroarsenate (LiAsF$_6$), 2 parts of nano-zirconia, 2 parts of diatomite, 2 parts of lithium phosphate, 2 parts of lithium titanate, 5 parts of vinyl ethylene carbonate, 3 parts of vinylene carbonate, and 2 parts of fluorocarbonate are added into 150 parts of xylene and 200 parts of ethyl acetate, and are stirred for 12 hours at a rotation speed of 800 r/min in an atmosphere of dry nitrogen or inert gas, and then 2 parts of dicyclohexylmethane diisocyanate and 1 part of toluene diisocyanate are added into the mixed system, the mixed solution is uniformly coated on a mold with a smooth surface, and reacts for 15 h at 70° C. in a vacuum drying oven into which nitrogen or inert gas is introduced and thus in an atmosphere of nitrogen or inert gas; and
S3, after the reaction is finished, in nitrogen or inert gas as a replacement gas, a drying treatment is carried out for 30 h at 90° C. in the vacuum drying oven, so as to obtain the solid polymer electrolyte.

A preparation method of a solid-state lithium ion battery is further disclosed in the present example, including following steps:
The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nanometer transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 4

A preparation method of a solid polymer electrolyte is disclosed in the present example, including following steps:
S1, based on parts by weight, 20 parts of 2-trifluoromethyl-trans-beta-styryl boronic acid pinacol ester, 10 parts of trans-2-(4-fluorophenyl)vinyl boronic acid, 10 parts of E-2-[3, 5-bis(trifluoromethyl)phenyl]vinyl boronic acid pinacol ester, 10 parts of polyethylene glycol allyl methyl ether, 20 parts of carboxy polyethylene glycol acrylate, 50 parts of methoxy polyethylene glycol acrylate, 2 parts of ethyl acrylate, 2 parts of acrylic acid, and 3 parts of polymethyl acrylate are added into 150 parts of toluene, 150 parts of dimethyl sulfoxide, and 150 parts of ethyl acetate, kept in an atmosphere of nitrogen or inert gas and are stirred for 120 min at a rotation speed of 1400 r/min, and then 2.00 parts of tert-butyl peroxybenzoate are added, and react for 40 h at 80° C., and after a purification treatment, a polymer system B is obtained;
S2, based on parts by weight, 75 parts of the polymer system B, 20 parts of lithium trifluoromethanesulfonate (LiCF$_3$SO$_3$), 10 parts of lithium bis(malonato) borate (LiBMB), 10 parts of lithium malonatooxalato borate (LiMOB), 5 parts of lithium titanium aluminum phosphate, 3 parts of lithium lanthanum titanate, 2 parts of lithium lanthanum tantalate, 10 parts of methoxy polyethylene glycol aluminate, and 5 parts of tetraethylene glycol dimethyl ether are added into 150 parts of tetrahydrofuran, 50 parts of acetonitrile, and 50 parts of dichloromethane, and are stirred for 6 hours at a rotation speed of 300 r/min in an atmosphere of dry nitrogen or inert gas, and then 2 parts of trifunctional aziridine crosslinking agent, 2 parts of difunctional aziridine crosslinking agent are added into the mixed system, the mixed solution is uniformly coated on a mold with a smooth surface, and reacts for 18 h at 50° C. in a vacuum drying oven into which nitrogen or inert gas is introduced and thus in an atmosphere of nitrogen or inert gas; and
S3, after the reaction is finished, in nitrogen or inert gas as a replacement gas, a drying treatment is carried out for 25 h at 85° C. in the vacuum drying oven, so as to obtain the solid polymer electrolyte.

A preparation method of a solid-state lithium ion battery is further disclosed in the present example, including following steps:
The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; and an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nano transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 5

A preparation method of a solid polymer electrolyte is disclosed in the present example, including following steps:
S1, based on parts by weight, 20 parts of 1-(1-(difluoroboryl)-oxy-3H-benzo(f)chromen-2-yl)-ethanone, 15 parts of trans-2-[3-(trifluoromethyl)phenyl]vinyl boronic acid, 15 parts of 4-trifluoromethyl-trans-beta-styryl boronic acid pinacol ester, 10 parts of polyethylene glycol methacrylic acid, 10 parts of polyethylene glycol diallyl ether, 10 parts of polyethylene glycol allyl methyl ether, 2 parts of 2-methyl methacrylate, 1 part of polyacrylonitrile, and 1 part of polyvinylidene fluoride-hexafluoropropylene are added into 200 parts of N-methyl pyrrolidone, 50 parts of carbon tetrachloride, and 100 parts of tetrahydrofuran, kept in an atmosphere of nitrogen or inert gas and are stirred for 150 min at a rotation speed of 1600 r/min, and then 1 parts of tert-butyl peroxybenzoate and 0.1 parts of azobisisoheptonitrile are added, and react for 50 h at 90° C., and after a purification treatment, a polymer system B is obtained;
S2, based on parts by weight, 60 parts of the polymer system B, 5 parts of lithium bis(oxalato) borate (LiBOB), 3 parts of lithium difluoro(oxalato) borate (LiDFOB), 2 parts of lithium bis(difluorosulfonyl)imide (LiFSI), 2 parts of ionic liquid, and 10 parts of methoxy polyethylene glycol borate are added into 120 parts of toluene and 200 parts of N-methyl pyrrolidone, and are stirred for 12 hours at a rotation speed of 1000 r/min in an atmosphere of dry nitrogen or inert gas, and then 1.00 part of trimethylolpropanetris-(3-aziridinylpropionate) and 1.00 part of pentaerythritol tris[3-(1-aziridinyl)propionic acid] are added into the mixed system, the mixed solution is uniformly coated on a mold with a smooth surface, and reacts for 12 h at 90° C. in a vacuum drying oven into which nitrogen or inert gas is introduced and thus in an atmosphere of nitrogen or inert gas; and
S3, after the reaction is finished, in nitrogen or inert gas as a replacement gas, a drying treatment is carried out for 35 h at 110° C. in the vacuum drying oven, so as to obtain the solid polymer electrolyte.

A preparation method of a solid-state lithium ion battery is further disclosed in the present example, including following steps:
The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; and an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nano transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 6

A preparation method of a solid polymer electrolyte is disclosed in the present example, including following steps:
S1, based on parts by weight, 20 parts of 3-trifluoromethyl-trans-beta-styryl boronic acid pinacol ester, 40 parts of trans-2-(3,5-difluorophenyl)vinyl boronic acid pinacol ester, 9 parts of carboxy polyethylene glycol acrylate, 1 part of polyethylene glycol dimethacrylate, 1 part of styrenesulfonic acid, 1 part of butenic acid, 4 parts of polytetrafluoroethylene, and 4 parts of polymethyl methacrylate are added into 100 parts of N-methyl pyrrolidone, 100 parts of chloroform, and 50 parts of acetonitrile, and are stirred for 60 min at a rotation speed of 400 r/min in an atmosphere of nitrogen or inert gas, and then 0.4 parts of azobisisoheptonitrile and 0.4 parts of dimethyl azodiisobutyrate are added, and then react for 25 h at 70° C., and the polymer system B is obtained after a purification treatment;
S2, based on parts by weight, 85 parts of the polymer system B, 15 parts of lithium bis(trifluoromethylsulfonyl)imide (LiTFSI), 5 parts of lithium hexafluoroantimonate (LiSbF$_6$), 5 parts of lithium difluorophosphate (LiPF$_2$O$_2$), 10 parts of lithium lanthanum platinum, 2 parts of lithium lanthanum platinum aluminum oxide, 1 part of fluorobenzene, 4 parts of methoxy polyethylene glycol borate, and 4 parts of methoxy polyethylene glycol aluminate are added into 300 parts of acetonitrile, 100 parts of toluene, and 100 parts of N-methyl pyrrolidone, and are stirred for 14 hours at a rotation speed of 1500 r/min in an atmosphere of dry nitrogen or inert gas, and then 1.00 part of isophorone diisocyanate is added into the mixed system, the mixed solution is uniformly coated on a mold with a smooth surface, and reacts for 26 h at 100° C. in a vacuum drying oven into which nitrogen or inert gas is introduced and thus in an atmosphere of nitrogen or inert gas; and
S3, after the reaction is finished, in nitrogen or inert gas as a replacement gas, a drying treatment is carried out for 45 h at 80° C. in the vacuum drying oven, so as to obtain the solid polymer electrolyte.

A preparation method of a solid-state lithium ion battery is further disclosed in the present example, including following steps.

The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; and an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nano transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 7

A preparation method of a solid polymer electrolyte is disclosed in the present example, including following steps:
S1, based on parts by weight, 40 parts of alpha-(trifluoromethyl)vinyl boronic acid, 20 parts of 1-(1-(difluoroboryl)-oxy-3H-benzo(f)chromen-2-yl)-ethanone, 20 parts of 3-trifluoromethyl-trans-beta-styryl boronic acid pinacol ester, 20 parts of polyethylene glycol methacrylic acid, 15 parts of polyethylene glycol methacrylate, 15 parts of carboxy polyethylene glycol acrylate, 1 part of styrenesulfonic acid, 5 parts of styrenesulfonic acid, and 5 parts of polymethyl methacrylate are added into 400 parts of N-methyl pyrrolidone and 100 parts of acetonitrile, and are stirred for 20 min at a rotation speed of 2000 r/min in an atmosphere of nitrogen or inert gas, and then 1 part of dimethyl azodiisobutyrate and 0.5 parts of benzoyl peroxide are added, and then react for 35 h at 85° C., and a polymer system B is obtained after a purification treatment;
S2, based on parts by weight, 100 parts of the polymer system B, 20 parts of lithium bis(difluorosulfonyl)imide (LiFSI), 20 parts of lithium bis(trifluoromethylsulfonyl)imide (LiTFSI), 10 parts of LiN(SO$_2$F)$_2$, 10 parts of lithium germanium aluminum phosphate, 10 parts of lithium aluminosilicate, 10 parts of methoxy polyethylene glycol aluminate, and 3 parts of butanedinitrile are added into 300 parts of acetonitrile and 100 parts of toluene, and are stirred for 4 hours at a rotation speed of 2000 r/min in an atmosphere of dry nitrogen or inert gas, and then 2.00 parts of pentaerythritol tris[3-(1-aziridinyl)propionic acid] and 3 parts of aliphatic polycarbodiimide are added into the mixed system, the mixed solution is uniformly coated on a mold with a smooth surface, and reacts for 36 h at 120° C. in a vacuum drying oven into which nitrogen or inert gas is introduced and thus in an atmosphere of nitrogen or inert gas; and S3, after the reaction is finished, in nitrogen or inert gas as a replacement gas, a drying treatment is carried out for 20 h at 120° C. in the vacuum drying oven, so as to obtain the solid polymer electrolyte.

A preparation method of a solid-state lithium ion battery is further disclosed in the present example, including following steps:

The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; and an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nano transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Example 8

A preparation method of a solid polymer electrolyte is disclosed in the present example, including following steps:

S1, based on parts by weight, 10 parts of 1-(1-(difluoroboryl)-oxy-3H-benzo(f)chromen-2-yl)-ethanone, 10 parts of 3-trifluoromethyl-trans-beta-styryl boronic acid pinacol ester, 10 parts of 1-trifluoromethyl vinyl boronic acid, 15 parts of polyethylene glycol phenyl ether acrylate, 15 parts of triethylene glycol dimethylacrylate, 15 parts of methoxy polyethylene glycol acrylate, and 4 parts of polymethyl acrylate are added into 100 parts of xylene, 100 parts of tetrahydrofuran, and 100 parts of N-methyl pyrrolidone, and are stirred for 60 min at a rotation speed of 1800 r/min in an atmosphere of nitrogen or inert gas, and then 1.00 part of azobisisoheptonitrile is added, and react for 45 h at 60° C., and a polymer system B is obtained after a purification treatment;

S2, based on parts by weight, 90 parts of the polymer system B, 10 parts of lithium tetrafluoroborate ($LiBF_4$), lithium bis(oxalato) borate (LiBOB), 10 parts of lithium difluoro(oxalato) borate (LiDFOB), 10 parts of lithium bis(difluorosulfonyl)imide (LiFSI), 15 parts of lithium bis(trifluoromethylsulfonyl)imide (LiTFSI), 6 parts of lithium phosphate, 6 parts of lithium titanium aluminum phosphate, 6 parts of boron trioxide doped lithium phosphate, 4 parts of butanedinitrile, and 2 parts of vinyl ethylene carbonate are added into 100 parts of acetonitrile and 100 parts of N-methyl pyrrolidone, and are stirred for 9 hours at a rotation speed of 1800 r/min in an atmosphere of dry nitrogen or inert gas, the mixed solution is uniformly coated on a mold with a smooth surface, and reacts for 24 h at 110° C. in a vacuum drying oven into which nitrogen or inert gas is introduced and thus in an atmosphere of nitrogen or inert gas; and S3, after the reaction is finished, in nitrogen or inert gas as a replacement gas, a drying treatment is carried out for 50 h at 90° C. in the vacuum drying oven, so as to obtain the solid polymer electrolyte.

A preparation method of a solid-state lithium ion battery is further disclosed in the present example, including following steps:

The obtained solid polymer electrolyte, a positive electrode plate, and a negative electrode plate are assembled into a solid-state battery core, and after a tab welding, a heat treatment, and an encapsulation treatment are performed, the solid-state lithium ion battery is obtained, where an active material in the positive electrode plate is lithium iron phosphate, lithium cobaltate, nickel-cobalt-manganese ternary battery material, lithium manganate, nickel-cobalt-aluminum ternary battery material, or lithium-rich manganese-based material; and where an active material in the negative electrode plate is one of carbon material, metal bismuth, lithium metal, nitride, magnesium-based alloy, indium-based alloy, boron-based material, silicon-based material, tin-based material, antimony-based alloy, gallium-based alloy, germanium-based alloy, aluminum-based alloy, lead-based alloy, zinc-based alloy, oxide of titanium, nano transition metal oxide MO, oxide of iron, oxide of chromium, oxide of molybdenum, and phosphide, or a combination of more of the above, where M is Co, Ni, Cu, or Fe.

The preparation of the electrode plates in the lithium ion battery and the processes of the tab welding, the heat treatment, and the encapsulation treatment of the battery, which are involved in the above steps, belong to conventional test means in the field.

Comparative Example 1

A preparation method of a solid polymer electrolyte is disclosed in the present comparative example, including following steps:

S1, based on parts by weight, 10 parts of polyethylene oxide (with a molecular weight of 500 W) are added into 300 parts of acetonitrile, and are stirred for 60 min at a rotation speed of 1800 r/min in an atmosphere of nitrogen or inert gas, so as to obtain a polymer system B;

S2, based on parts by weight, 90 parts of the polymer system B, 10 parts of lithium tetrafluoroborate ($LiBF_4$), lithium bis(oxalato) borate (LiBOB), 10 parts of lithium difluoro(oxalato) borate (LiDFOB), 10 parts of lithium bis(difluorosulfonyl)imide (LiFSI), 15 parts of lithium bis(trifluoromethylsulfonyl)imide (LiTFSI), 6 parts of lithium phosphate, 6 parts of lithium titanium aluminum phosphate, 6 parts of boron trioxide doped lithium phosphate, 4 parts of butanedinitrile, and 2 parts of vinyl ethylene carbonate are added into 100 parts of acetonitrile and 100 parts of N-methyl pyrrolidone, and are stirred for 9 hours at a rotation speed of 1800 r/min in an atmosphere of dry nitrogen or inert gas, the mixed solution is uniformly coated on a mold with a smooth surface, and reacts for 24 h at 110° C. in a vacuum drying oven into which nitrogen or inert gas is introduced and thus in an atmosphere of nitrogen or inert gas; and S3, after the reaction is finished, in nitrogen or inert gas as a replacement gas, a drying treatment is carried out for 50 h at 90° C. in the vacuum drying oven, so as to obtain the solid polymer electrolyte.

Comparative Example 2

A preparation method of a solid polymer electrolyte is disclosed in the present comparative example, including following steps:
S1, based on parts by weight, 10 parts of polyethylene oxide (with a molecular weight of 500 W) are added into 300 parts of acetonitrile, and are stirred for 60 min at a rotation speed of 1800 r/min in an atmosphere of nitrogen or inert gas, so as to obtain a polymer system B;
S2, based on parts by weight, 90 parts of the polymer system B and 45 parts of lithium bis(trifluoromethyl-sulfonyl)imide (LiTFSI) are added into 200 parts of acetonitrile, and are stirred for 9 hours at a rotation speed of 1800 r/min in an atmosphere of dry nitrogen or inert gas, the mixed solution is uniformly coated on a mold with a smooth surface, and reacts for 24 h at 110° C. in a vacuum drying oven into which nitrogen or inert gas is introduced and thus in an atmosphere of nitrogen or inert gas; and
S3, after the reaction is finished, in nitrogen or inert gas as a replacement gas, a drying treatment is carried out for 50 h at 90° C. in the vacuum drying oven, so as to obtain the solid polymer electrolyte.

Experimental Data 1:

The composite all-solid polymer electrolytes prepared in Examples 1-8 and the polyethylene oxide (with the molecular weight of 500 W) electrolytes in Comparative example 1 and Comparative example 2 were subjected to room temperature conductivity and electrochemical window tests, and test results were shown in Table 1 below.

TABLE 1

| Number | Ionic conductivity at room temperature (S/cm) | Electrochemical window (V) |
|---|---|---|
| Comparative example 1 | $1.57 \times 10^{-5}$ | 3.8 |
| Comparative example 2 | $1.26 \times 10^{-5}$ | 3.8 |
| Example 1 | $2.92 \times 10^{-4}$ | 4.7 |
| Example 2 | $3.76 \times 10^{-4}$ | 4.9 |
| Example 3 | $2.68 \times 10^{-4}$ | 5.0 |
| Example 4 | $1.73 \times 10^{-4}$ | 5.0 |
| Example 5 | $2.85 \times 10^{-4}$ | 4.8 |
| Example 6 | $1.60 \times 10^{-5}$ | 5.1 |
| Example 7 | $3.26 \times 10^{-4}$ | 4.7 |
| Example 8 | $4.26 \times 10^{-4}$ | 4.8 |

It can be seen from the test results in the above table that, the conductivity of the polyethylene oxide polymer electrolyte (polymer+lithium salt) at room temperature is $1.26 \times 10^{-5}$ S/cm, and the electrochemical window is 3.8V. Compared with conventional polyethylene oxide, novel polymers (Examples 1-8) prepared in the present disclosure structurally introduce boron and fluorine structures by adopting molecular design method, and have more excellent ionic conductivity at room temperature, electrochemical window and tensile strength, and have better application potential. Moreover, comparison between Comparative examples 1 and 2 and Examples 1-8 in test results showed that the polymers containing boron and fluorine structures prepared in the present disclosure have good dissociation effect on lithium salt, and are able to effectively improve lithium ion conductivity.

Experimental Data 2:

In the present example, the polymer electrolytes prepared in Examples 1-8, Comparative example 1 and Comparative example 2 were each uniformly mixed with a ternary material, a conductive agent, a binder and a solvent, and then were each coated on an aluminum foil to prepare a positive electrode of a composite solid-state battery. The positive electrode and a polymer electrolyte corresponding thereto, and lithium metal were assembled into a solid-state battery. Charge and discharge tests were performed on solid-state batteries, and test results were shown in FIGURE.

From the charge and discharge test results (FIGURE) of the solid-state batteries, it can be seen that the polymer electrolytes containing the boron and fluorine structures prepared in the present disclosure (Examples 1-8) have more excellent ionic conductivity and electrochemical window, compared with conventional polyethylene oxide (Comparative examples 1 and 2). A specific analysis is as follows: firstly, from comparison of the test results of Comparative examples 1 and 2 using polyethylene oxide, Comparative example 1 is superior to Comparative example 2, which shows that the multiple composite lithium salts of the polymer electrolyte and preparation method thereof in the present disclosure are able to effectively improve the performance of the polymer electrolyte, and improve the performance of the solid-state battery; and secondly, by comparing the test results of Examples 1-8 and Comparative examples 1 and 2, it can be known that the solid-state batteries prepared from the polymer electrolytes containing the boron and fluorine structures obtained by the method of the present disclosure have good charge and discharge performances and better application potential.

The above examples are preferred embodiments of the present disclosure, but embodiments of the present disclosure are not limited to the above examples, and any other changes, modifications, substitutions, combinations, and simplifications without departing from the spirit and principle of the present disclosure shall be equivalent replacement, and all included in the protection scope of the present disclosure.

What is claimed is:

1. A polymer electrolyte containing boron and fluorine structures, having a structural formula represented by Formula (I):

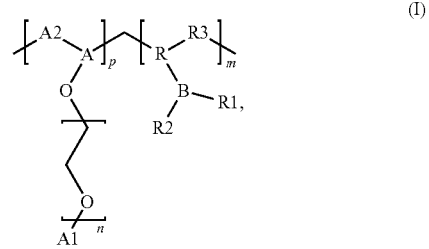

wherein the polymer electrolyte is a copolymer, comprising a first repeating unit, denoted by subscript p, is derived from at least one vinyl polyether monomer, and a second repeating unit, denoted by subscript m, is derived from at least one vinyl boron fluorine monomer;

wherein A, A1, A2, R, R1, R2 and R3 each is an organic functional group;
R, R1, R2, and R3 contain at least one fluorine structure;
a molar ratio of the first repeating unit to the second repeating unit is between (1:9) and (9:1);
n, m and p are positive integers.

2. The polymer electrolyte according to claim 1, wherein the boron structure includes C—B, B—O or B—F.

3. The polymer electrolyte according to claim 1, wherein the polymer electrolyte in unit mole contains 0.1 to 0.9 moles of the boron structure.

4. The polymer electrolyte according to claim 1, wherein the polymer electrolyte in unit mole contains 0.1 to 18 moles of the fluorine structure.

5. The polymer electrolyte according to claim 1, wherein a molar ratio of the boron structure to the fluorine structure is between 1:20 and 1:1.

6. The polymer electrolyte according to claim 5, wherein the molar ratio of the boron structure to the fluorine structure is between 1:12 and 1:1.

7. A lithium ion battery, comprising the polymer electrolyte according to claim 1.

* * * * *